(12) United States Patent
Sauvlet et al.

(10) Patent No.: US 9,175,633 B2
(45) Date of Patent: Nov. 3, 2015

(54) ENGINE STARTING METHOD
(71) Applicant: Dr. Ing. h.c.F. Porsche Aktiengesellschaft, Stuttgart (DE)
(72) Inventors: Nils Sauvlet, Rutesheim (DE); Markus Oel, Lippstadt (DE); Joerg-Michael Birkhold, Gerlingen (DE)
(73) Assignee: Dr. Ing. h.c. F. Porsche Aktiengesellschaft (DE)
( * ) Notice: Subject to any disclaimer, the term of this patent is extended or adjusted under 35 U.S.C. 154(b) by 98 days.
(21) Appl. No.: 13/847,665
(22) Filed: Mar. 20, 2013
(65) Prior Publication Data
US 2013/0247870 A1 Sep. 26, 2013
(30) Foreign Application Priority Data
Mar. 20, 2012 (DE) .......................... 10 2012 102 342
(51) Int. Cl.
*B60K 6/48* (2007.10)
*F02D 45/00* (2006.01)
(Continued)
(52) U.S. Cl.
CPC . *F02D 45/00* (2013.01); *B60K 6/48* (2013.01); *B60W 10/02* (2013.01); *B60W 10/06* (2013.01);
(Continued)
(58) Field of Classification Search
CPC ............... B60W 10/11; B60W 20/30; B60W 2710/027; B60W 10/30; B60W 2510/0657; B60W 2510/083; B60W 2510/0208; B60W 2510/0275; B60W 20/40; B60W 10/02; B60W 10/06; B60W 10/08; B60W 20/00; B60W 2710/025; B60W 2710/083; B60W 2510/0638; B60W 2710/023; B60W 30/18; B60W 2510/0241; F02D 45/00; F02D 11/0851; F02D 15/022; F02D 11/00; B60K 6/48; B60K 2006/4825; B60K 2006/4808; B60K 2006/268; F02N 11/08; F02N 15/022; F02N 11/0851; F02N 11/00; Y02T 10/6221; Y02T 10/6252; Y02T 10/6286; B60L 15/2054; Y10T 477/755; Y10T 477/32; Y10T 477/79; Y10T 477/78; Y10T 477/635; Y10T 477/6403; Y10T 477/6418; Y10T 477/27; Y10S 903/946; Y10S 903/905
See application file for complete search history.

(56) References Cited
U.S. PATENT DOCUMENTS
8,142,328 B2 3/2012 Reuschel
8,313,415 B2 11/2012 Lochocki, Jr. et al.
(Continued)

FOREIGN PATENT DOCUMENTS
CN 102009588 4/2011
DE 10 2008 030 480 1/2009
(Continued)

OTHER PUBLICATIONS
German Search Report of Feb. 20, 2013.

*Primary Examiner* — Lindsay Low
*Assistant Examiner* — Brian P Monahon
(74) *Attorney, Agent, or Firm* — Gerald E. Hespos; Michael J. Porco; Matthew T. Hespos (57) ABSTRACT

A motor vehicle has an internal combustion engine and at least one electric motor as a drive motor arranged on a common shaft. The internal combustion engine and/or the electric motor can introduce torque into a transmission downstream in the drivetrain, and a separating clutch is provided between the internal combustion engine and the electric motor. The method increases torque of the electric machine, increasing the rotational speed of the electric machine and setting slip conditions at a clutch of the downstream transmission, engaging the separating clutch to a torque between the reserve torque of the electric motor and the maximum transmissible torque, reducing the transmissible torque of the separating clutch when the rotational speed of the internal combustion engine has reached the ignition rotational speed, ending the slip conditions of the at least one clutch of the downstream transmission, ending the increase of the torque of the electric motor.

7 Claims, 5 Drawing Sheets (51) Int. Cl.

| | |
|---|---|
| *B60W 10/02* | (2006.01) |
| *B60W 10/04* | (2006.01) |
| *B60W 10/06* | (2006.01) |
| *B60W 10/08* | (2006.01) |
| *F02N 15/02* | (2006.01) |
| *B60W 20/00* | (2006.01) |
| *F02N 11/08* | (2006.01) |

(52) U.S. Cl.
CPC ............... *B60W 10/08* (2013.01); *B60W 20/40* (2013.01); *F02N 11/08* (2013.01); *F02N 15/022* (2013.01); *B60K 2006/4825* (2013.01); *Y02T 10/6221* (2013.01); *Y02T 10/6252* (2013.01); *Y02T 10/6286* (2013.01)

(56) References Cited

U.S. PATENT DOCUMENTS

| | | | |
|---|---|---|---|
| 8,506,450 B2 | 8/2013 | Nakasako | |
| 2001/0030099 A1* | 10/2001 | Fliege | 192/91 A |
| 2007/0080005 A1 | 4/2007 | Joe | |
| 2007/0102211 A1 | 5/2007 | Nozaki et al. | |
| 2007/0157899 A1* | 7/2007 | Seufert et al. | 123/179.25 |
| 2007/0278022 A1* | 12/2007 | Tanishima | 180/65.2 |
| 2008/0011529 A1* | 1/2008 | Hoher et al. | 180/65.2 |
| 2008/0245332 A1* | 10/2008 | Rimaux et al. | 123/179.24 |
| 2009/0017988 A1* | 1/2009 | Reuschel | 477/167 |
| 2010/0056328 A1* | 3/2010 | Schenk et al. | 477/8 |
| 2011/0130911 A1 | 6/2011 | Allgaier et al. | |

FOREIGN PATENT DOCUMENTS

| | | |
|---|---|---|
| DE | 10 2007 047 091 | 4/2009 |
| DE | 10 2008 027 658 | 12/2009 |
| DE | 10 2008 040 662 | 1/2010 |
| JP | 2006306209 | 11/2006 |
| JP | 2009208562 | 9/2009 |
| JP | 201064563 | 3/2010 |
| JP | 2010143365 | 7/2010 |
| JP | 2010168007 | 8/2010 |
| KR | 100708595 | 4/2007 |
| KR | 1020090044129 | 5/2009 |

* cited by examiner

ENGINE STARTING METHOD

CROSS REFERENCE TO RELATED APPLICATIONS

This application claims priority under 35 USC 119 to German Patent Appl. No. 10 2012 102 342.5 filed on Mar. 20, 2012, the entire disclosure of which is incorporated herein by reference.

BACKGROUND

1. Field of the Invention

The invention relates to an engine starting method, in particular for an internal combustion engine of a motor vehicle having an internal combustion engine and having at least one electric motor as a drive motor. The invention also relates to a motor vehicle for carrying out an engine starting method.

2. Description of the Related Art

Motor vehicles having an internal combustion engine and an electric motor are known in the prior art and are also referred to as hybrid vehicles. If the internal combustion engine and the electric motor are arranged on one shaft, this arrangement is also referred to as a parallel hybrid.

The motor vehicle may be driven either only by the internal combustion engine, only by the electric motor or by the internal combustion engine and the electric motor simultaneously. The internal combustion engine can be connected to the electric motor by means of a clutch. A transmission can be connected to the electric motor downstream in the torque flow and the drivetrain can be connected to the transmission downstream. The clutch between the internal combustion engine and the electric machine is disengaged when the internal combustion engine is deactivated so that there is no power-transmitting connection between the internal combustion engine and the electric motor. In this operating situation, the electric motor alone drives the vehicle.

The clutch must be engaged if the internal combustion engine is to be started so that the internal combustion engine can be turned over up to the starting rotational speed at which the engine can start of its own accord. Here, however, unpleasant juddering is experienced by the vehicle occupants, because torque that was available for the forward propulsion of the vehicle before the starting of the internal combustion engine suddenly is branched away and no longer available for forward propulsion due to the turning-over of the internal combustion engine.

DE 10 2008 040 662 A1 discloses a system where a clutch torque is raised linearly, then held at a plateau as a function of time, and for thereafter is raised linearly again. The system is intended to determine the breakaway torque of the internal combustion engine, because it changes over the course of the operation of the engine.

This approach, however, entails a method step that fundamentally delays the starting of the engine and also is perceived as being rather unpleasant. Also, the friction power input into the clutch is increased so that the method is not recommended for thermal reasons.

SUMMARY OF THE INVENTION

It is an object of the invention to provide an engine starting method for an internal combustion engine of a motor vehicle having an internal combustion engine and having at least one electric motor as a drive motor, The method permits fast but comfortable starting of the internal combustion engine and generates a low friction power input into the separating clutch. It is also an object to provide a motor vehicle that permits fast but comfortable starting of the internal combustion engine and, in the process yields a low friction power input into the separating clutch.

The object of the method is achieved by an engine starting method for an internal combustion engine of a motor vehicle having an internal combustion engine and having at least one electric motor as a drive motor. The internal combustion engine and the electric motor are arranged on a common shaft so that the internal combustion engine and/or the electric motor can introduce torque into a transmission arranged downstream in the drivetrain. A separating clutch is provided between the internal combustion engine and the electric motor. The method includes the steps of:

a. increasing the torque of the electric machine,
b. increasing the rotational speed of the electric machine and setting slip conditions at least one clutch of the downstream transmission,
c. engaging the separating clutch to a torque between the reserve torque of the electric motor and the maximum transmissible torque,
d. reducing the transmissible torque of the separating clutch when the rotational speed of the internal combustion engine has at least substantially reached the ignition rotational speed,
e. ending the slip conditions of the at least one clutch of the downstream transmission,
f. ending the increase of the torque of the electric motor.

This method yields a low friction power input because the starting process takes place relatively quickly in relation to the prior art and uses the increase of the rotational speed of the electric motor to accelerate the internal combustion engine to a rotational speed approaching or corresponding to the ignition rotational speed.

The increase of the rotational speed of the electric machine preferably takes place to such an extent that the kinetic energy thereby stored is sufficient to increase a rotational speed of the internal combustion engine, preferably to a rotational speed value at least close to the ignition rotational speed of the internal combustion engine. The separating clutch is disengaged again when the ignition rotational speed has been at least substantially reached, and the torque transmissible by the separating clutch is reduced.

The engagement and/or disengagement of the separating clutch preferably takes place in a torque-modulated manner and in a controlled manner in multiple phases. The control advantageously takes place in a stepped manner in the phases.

The torque transmissible by the separating clutch set in a first phase preferably lies substantially above the reserve torque of the electric motor, and most preferably corresponds to at least twice the reserve torque. The transmissible torque also may be greater in the first phase. It is particularly advantageous for the transmissible torque to attain a value that leads to a fast reduction of the rotational speed of the electric motor. A transmissible torque in the second phase may be set to correspond substantially to the reserve torque of the electric motor and thus is reduced. The transmissible torque set in the second phase may also be even lower, even zero.

The transmissible torque set in a second phase preferably is reduced in relation to the torque set in the first phase.

The transmissible torque also may be reduced to the value of the reserve torque or to zero.

The transmissible torque set in a second phase preferably is reduced in relation to the torque set in the first phase. The transmissible torque advantageously is reduced to a value approximately equal to the reserve torque. The time duration of the setting preferably is in a range of approximately 50 ms to 100 ms, so that a fast engine start and only a short friction time are realized. The duration of the phases then lies in the time range of approximately 20 ms to 50 ms.

The transmissible torque preferably is the maximum torque.

It is likewise advantageous for the friction time of the separating clutch to lie in the range from less than 50 ms to approximately 100 ms to 150 ms.

The object invention also relates to a motor vehicle having an internal combustion engine and having at least one electric motor as a drive motor, wherein the internal combustion engine and the electric motor are arranged on a common shaft. The internal combustion engine and/or the electric motor can introduce torque into a transmission arranged downstream in the drivetrain, and a separating clutch is provided between the internal combustion engine and the electric motor, for carrying out an engine starting method.

A damper preferably is arranged between the internal combustion engine and the electric motor or downstream of the electric motor.

The transmission may be a dual-clutch transmission having two clutches.

The invention will be explained in more detail below on the basis of at least one exemplary embodiment and with reference to the drawings.

DETAILED DESCRIPTION OF THE PREFERRED EMBODIMENTS

Figure 1:
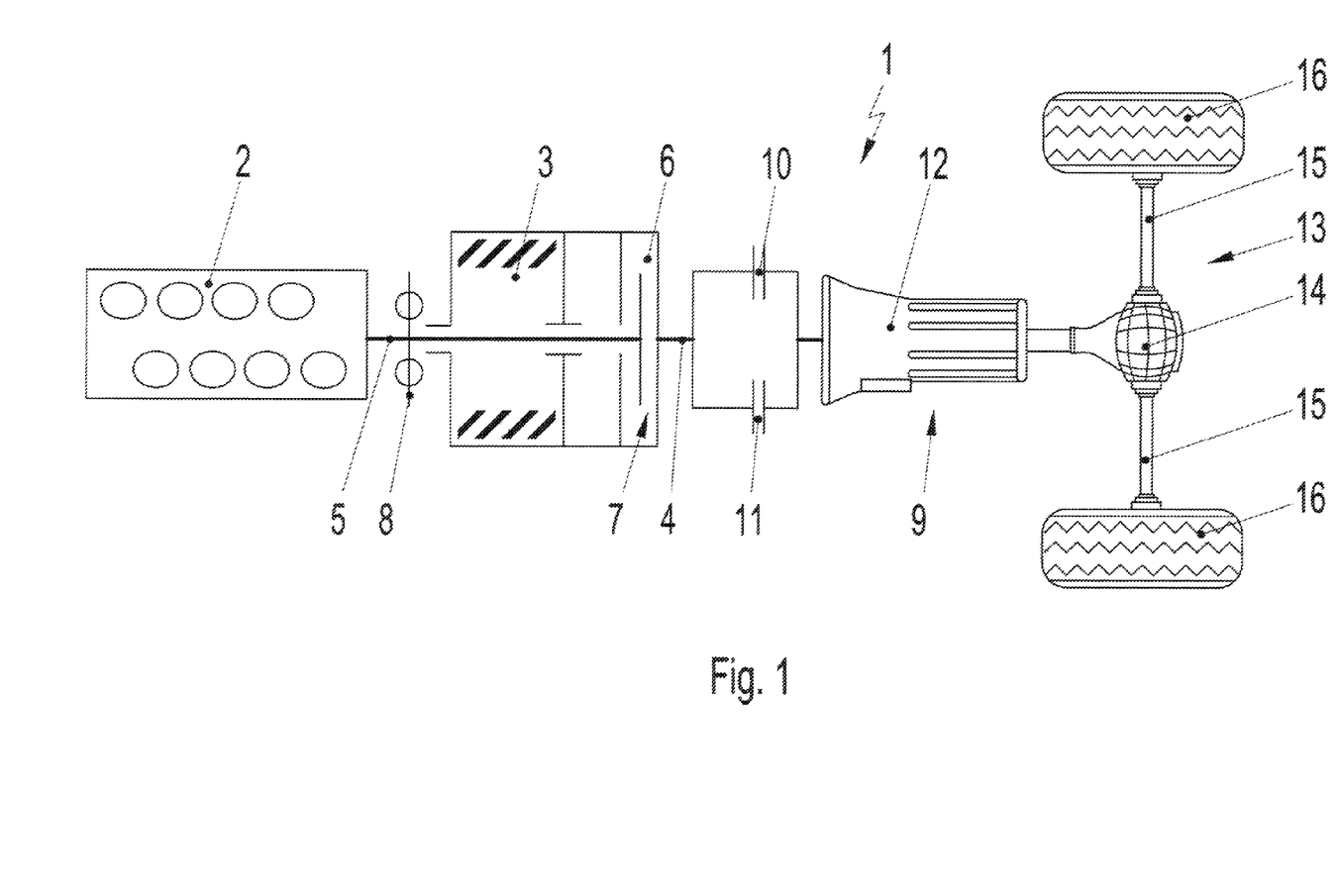
FIG. 1 is a schematic view of a motor vehicle having an internal combustion engine and an electric motor.

FIG. 1 is a schematic view of a motor vehicle 1 having an internal combustion engine 2 and having an electric motor 3. Here, the internal combustion engine 2 and the electric motor 3 are arranged on a common shaft 4, which means that the drive output 5 of the internal combustion engine 2 and the drive output 6 of the electric motor 3 transmit onto the same shaft 4.

Between the internal combustion engine 2 and the separating clutch 7, that is to say between the internal combustion engine 2 and the electric motor 3, there is provided a damper 8 which may for example be in the form of a dual-mass flywheel.

The separating clutch 7 can connect the output shaft of the internal combustion engine 2 to the output shaft 6 of the electric motor 3 in a torque-transmitting manner. In the disengaged state, the clutch 7 is open and transmits no torque of the internal combustion engine 2 to the shaft 4. Here, the torque transmissible by the clutch may be modulated in a controlled manner. By means of said modulation of the transmissible torque, for example by means of control of a contact pressure of a clutch disk in the clutch between a thrust plate and a clutch housing, it is possible in a targeted manner to set slip conditions or a transmissible torque.

Downstream of the electric motor 3 in the torque flow there is arranged a dual-clutch transmission 9 having two clutches 10, 11 and the related transmission 12, which is illustrated merely schematically. Downstream thereof is arranged a further drivetrain 13 with a differential 14 and axles 15 and driven wheels 16.

Figure 2:
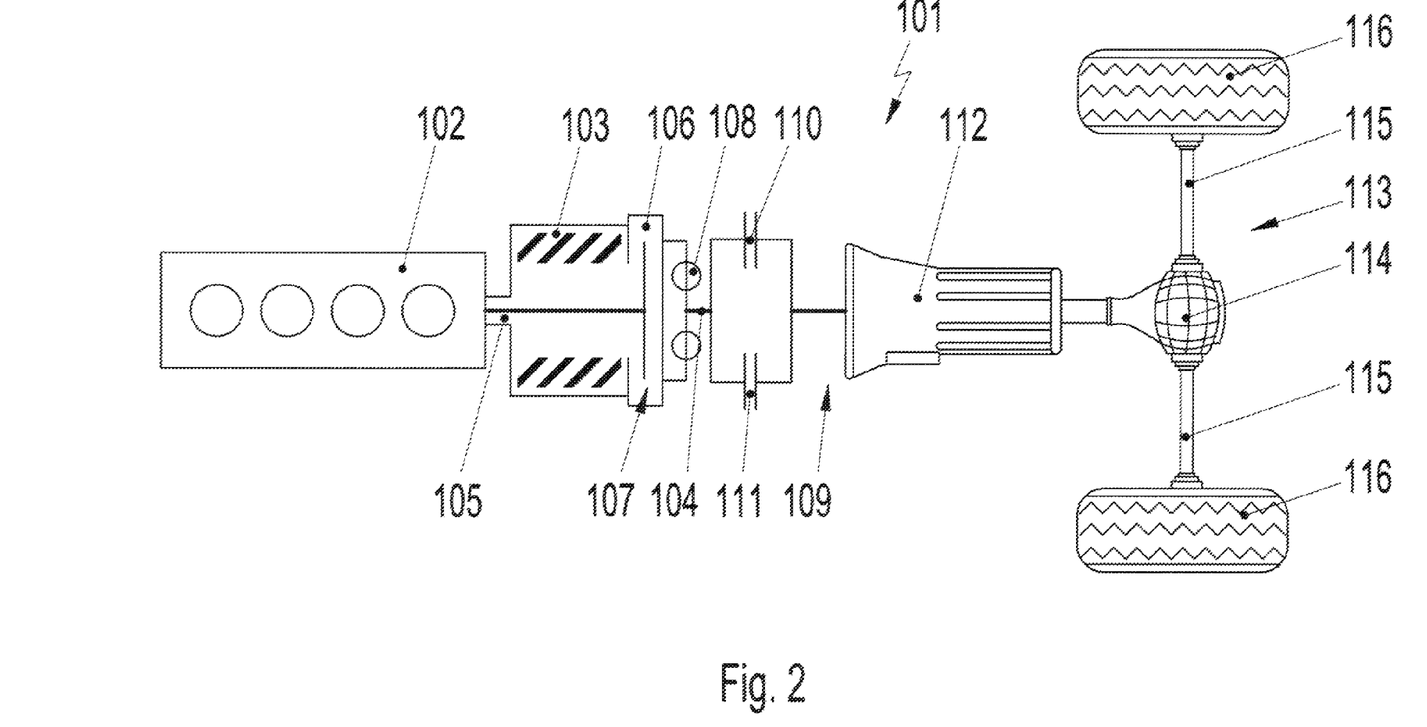
FIG. 2 is a schematic view of a motor vehicle having an internal combustion engine and an electric motor.

FIG. 2 shows a schematic view of an alternative illustration of a motor vehicle 101 having an internal combustion engine 102 and an electric motor 103. Here, the internal combustion engine 102 and the electric motor 103 are again arranged on a common shaft 104, which means that the drive output 105 of the internal combustion engine 102 and the drive output 106 of the electric motor 103 transmit onto the same shaft 104.

Downstream of the internal combustion engine 102 there is arranged a separating clutch 107. Arranged downstream of the electric motor 103 is a damper 108 which may for example be in the form of a dual-mass flywheel.

The separating clutch 107 can connect the output shaft of the internal combustion engine 102 to the output 106 of the electric motor 103 in a torque-transmitting manner. In the disengaged state, the clutch 107 is likewise open and transmits no torque of the internal combustion engine 102 to the shaft 104. Here, the torque transmissible by the clutch 107 may again be modulated in a controlled manner. By means of said modulation of the transmissible torque, for example by means of control of a contact pressure of a clutch disk in the clutch between a thrust plate and a clutch housing, it is possible in a targeted manner to set slip conditions or a transmissible torque.

Downstream of the electric motor 103 in the torque flow there is likewise arranged a dual-clutch transmission 109 having two clutches 110, 111 and the related transmission 112, which is illustrated merely schematically. Downstream thereof is arranged a further drivetrain 113 with a differential 114 and axles 115 and driven wheels 116. The damper 108 is thus arranged between the electric motor 108 and the dual-clutch transmission 109.

Figure 3:
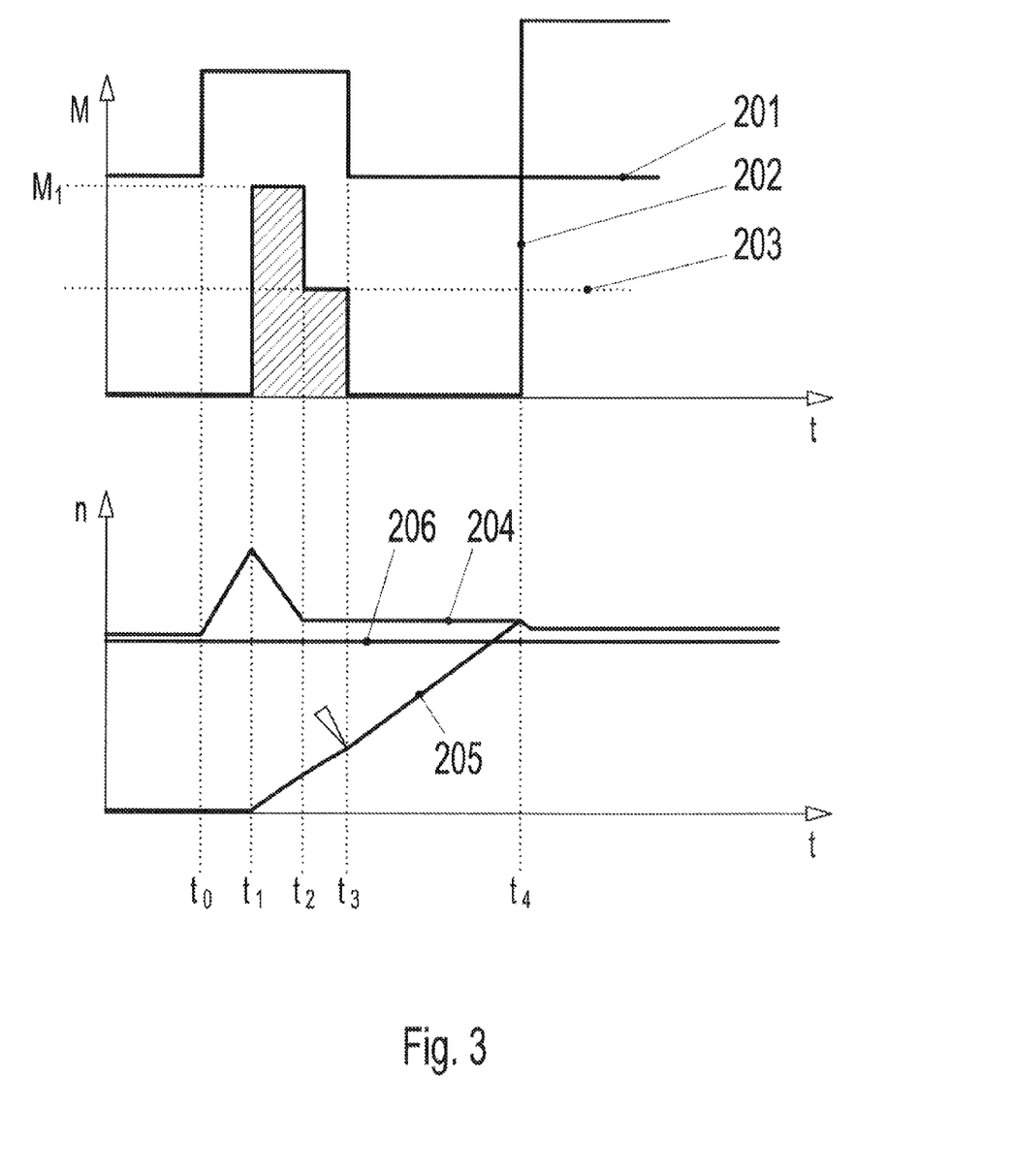
FIG. 3 is a diagram illustrating torques as a function of the time and a diagram illustrating rotational speeds as a function of the time.

The upper diagram of FIG. 3 shows the profile with respect to time of torques M as a function of the time t, wherein the lower diagram of FIG. 3 shows the profile with respect to time of rotational speeds n as a function of the time t.

The curve 201 shows the profile with respect to time of the torque of the electric motor, the curve 202 shows the profile with respect to time of the transmissible torque of the separating clutch, and the curve 203 shows the reserve torque of the electric motor.

The curve 204 shows the profile with respect to time of the rotational speed n of the electric motor, the curve 205 shows the profile with respect to time of the rotational speed n of the internal combustion engine, and the curve 206 shows the rotational speed n at the transmission input of the downstream transmission 12, 112.

At the time t0, the torque and the rotational speed of the electric motor are increased. The torque 201 is raised, in one step, to a new value and remains constant there. The rotational speed increase of the electric motor follows this linearly as per the curve 204. Kinetic energy is thus stored in the electric motor.

Since the vehicle speed should not increase, because the increased rotational speed and the increased torque are to be used not for drive but rather for starting the engine, slip conditions are set at least at one clutch of the downstream transmission, such that the driving speed of the vehicle remains unchanged.

At the time t1, the transmissible torque of the separating clutch is raised from zero to a predefinable value M1. This may take place linearly here with a high gradient or in a step-like manner, see FIG. 3. Here, the value of M1 preferably lies considerably above the reserve torque of the electric motor. The torque is preferably at least twice the reserve torque of the electric motor.

The targeted engagement of the separating clutch at the time t1 has the effect that, between t1 and t2, the rotational speed of the electric motor decreases and the rotational speed of the internal combustion engine increases.

At the time t2, the transmissible torque of the separating clutch is subsequently reduced again, wherein said transmissible torque is lowered approximately to the reserve torque 203 of the electric motor. Said transmissible torque may however also be lowered further, for example to zero. The reduction of the rotational speed of the electric motor is thereby ended, and the rotational speed of the electric motor remains substantially constant. After the internal combustion engine has, at the time t3, reached a rotational speed at least corresponding to the ignition rotational speed, the ignition of the internal combustion engine can be performed and the rotational speed of said internal combustion engine then rises to the rotational speed of the electric motor, and at the same time, at t3, the separating clutch is disengaged again. At said time t3, the slip conditions of the at least one clutch of the downstream transmission are ended, and the increase of the torque of the electric motor is also ended at t3. At t4, after the internal combustion engine reaches the electric motor rotational speed, the separating clutch is closed.

Figure 4:
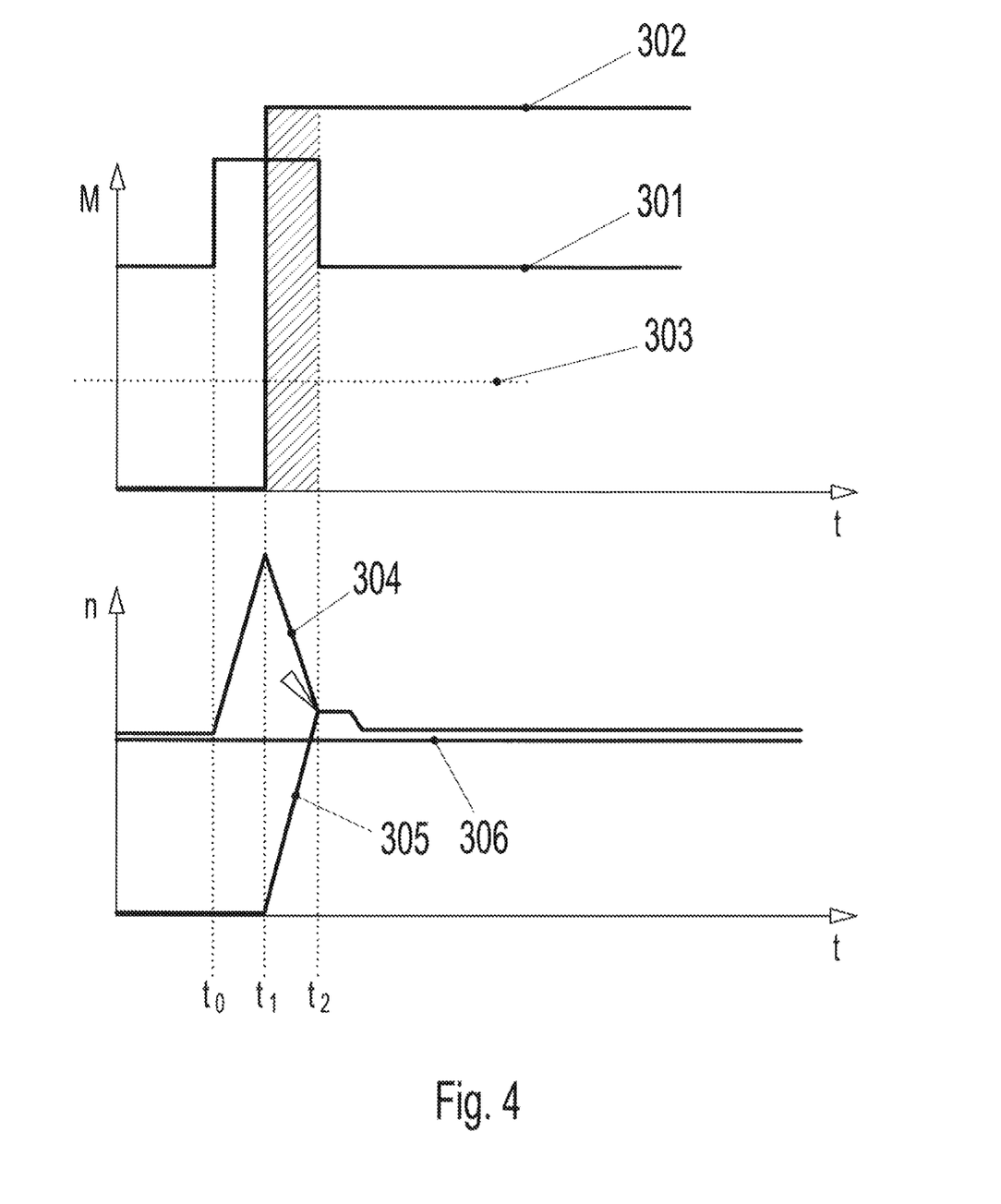
FIG. 4 is a diagram illustrating torques as a function of the time and a diagram illustrating rotational speeds as a function of the time.

The upper diagram of FIG. 4 shows the profile with respect to time of torques M as a function of the time t, wherein the lower diagram of FIG. 4 shows the profile with respect to time of rotational speeds n as a function of the time t.

The curve 301 shows the profile with respect to time of the torque of the electric motor, the curve 302 shows the profile with respect to time of the transmissible torque of the separating clutch, and the curve 303 shows the reserve torque of the electric motor.

The curve 304 shows the profile with respect to time of the rotational speed n of the electric motor, the curve 305 shows the profile with respect to time of the rotational speed n of the internal combustion engine, and the curve 306 shows the rotational speed n at the transmission input of the downstream transmission 12, 112.

At the time t0, the torque and the rotational speed of the electric motor are increased. The torque 301 is raised, in one step, to a new value and initially remains constant there. The rotational speed increase of the electric motor follows this linearly as per the curve 304. Increased kinetic energy is thus stored in the electric motor.

Since it is again the case that the vehicle speed should not increase, because the increased rotational speed and the increased torque are to be used not for drive but rather for starting the engine, slip conditions are set at least one clutch of the downstream transmission, such that the driving speed of the vehicle remains unchanged.

At the time t1, the transmissible torque of the separating clutch is raised from zero to a predefinable value M1 which lies between the reserve torque of the electric motor and the maximum transmissible torque of the separating clutch. This may take place linearly here with a high gradient or in a substantially step-like manner, see FIG. 3. Here, the value of M1 preferably lies above the reserve torque of the electric motor, or is several times, such as for example two times to five times or even up to ten times, higher than the reserve torque of the electric motor.

The targeted engagement of the separating clutch at the time t1 has the effect that, between t1 and t2, the rotational speed of the electric motor decreases and the rotational speed of the internal combustion engine increases to the rotational speed of the electric motor. Kinetic energy is thus transmitted from the electric motor to the internal combustion engine, and the latter is accelerated.

At the time t2, the increase of the torque of the electric motor is ended.

Figure 5:
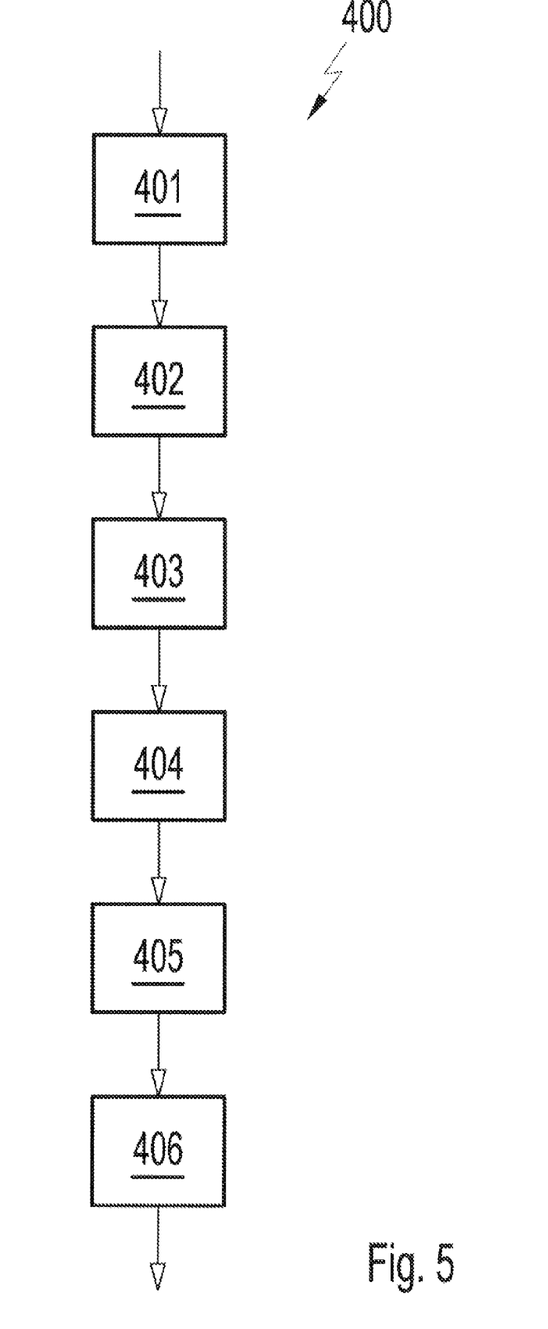
FIG. 5 is a block diagram illustrating a sequence of a method according to the invention.

FIG. 5 shows a block diagram 400 for explaining the invention.

The increase of the torque of the electric machine takes place in block 401; the resulting increase of the rotational speed of the electric machine takes place in block 402; the resulting setting of slip conditions at least one clutch of the downstream transmission takes place in block 403. The controlled engagement of the separating clutch takes place in block 404, the ending of the slip conditions of the at least one clutch of the downstream transmission takes place in block 405, and the ending of the increase of the torque of the electric motor takes place in block 406.

What is claimed is:

1. An engine starting method for an internal combustion engine of a motor vehicle having an internal combustion engine and having at least one electric motor as a drive motor, wherein the internal combustion engine and the electric motor are arranged on a common shaft, wherein the internal combustion engine and/or the electric motor can introduce torque into a transmission arranged downstream in the drivetrain, and a separating clutch is provided between the internal combustion engine and the electric motor, having the steps:
   a. increasing the torque of the electric motor,
   b. increasing the rotational speed of the electric motor and setting slip conditions at least one clutch of the downstream transmission,
   c. engaging the separating clutch to a transmissible torque greater than a reserve torque of the electric motor and no greater than a maximum transmissible torque, thereby decreasing the rotational speed of the electric motor and increasing a rotational speed of the internal combustion engine,
   d. reducing the transmissible torque of the separating clutch while maintaining the rotational speed of the electric motor constant when the rotational speed of the internal combustion engine has at least substantially reached the ignition rotational speed,
   e. starting the internal combustion engine, disengaging the separating clutch, and ending the slip conditions of the at least one clutch of the downstream transmission,
   f. ending the increase of the torque of the electric motor when starting the internal combustion engine, and
   g. closing the separating clutch when the rotational speed of the internal combustion engine equals the rotational speed of the electric motor.

2. The method of claim 1, wherein the increase of the rotational speed of the electric motor takes place to such an extent that the kinetic energy thereby stored is sufficient to increase a rotational speed of the internal combustion engine to a rotational speed value at least close to the ignition rotational speed of the internal combustion engine.

3. The method of claim 1, wherein the engagement or disengagement again of the separating clutch takes place in a torque-modulated manner in multiple phases.

4. The method of claim 3, wherein the torque transmissible by the separating clutch set in a first phase is at least twice as great as the reserve torque of the electric motor.

5. The method of claim 4, wherein the transmissible torque set in a second phase is reduced in relation to the torque set in the first phase.

6. The method of claim 5, wherein the transmissible torque is reduced to the value of the reserve torque or to zero.

7. The method of claim 1, wherein the friction time of the separating clutch lies in the range from less than 50 ms to 150 ms.

* * * * *